Sept. 3, 1968 R. R. D. J. ECHARD ET AL 3,399,624

CIRCULATION PUMPS

Filed April 15, 1966

Inventor
R. R. D. J. ECHARD-
J. N. L. KRAIT
By Robert G. Crooks
Attorney

United States Patent Office 3,399,624
Patented Sept. 3, 1968

1

3,399,624
CIRCULATION PUMPS

Rollan Roger Desire Jean Echard, Paris, and Jamine Nicole Louise Krait, Fontenay-aux-Roses, France, assignors to International Standard Electric Corporation, New York, N.Y., a corporation of Delaware Filed Apr. 15, 1966, Ser. No. 542,859
Claims priority, application France, May 18, 1965, 17,456
10 Claims. (Cl. 103—87)

ABSTRACT OF THE DISCLOSURE

A circulating pump using resilient flaps mounted on an electromagnetically operated rotary actuator to provide the fluid impelling force.

Figures 1, 2:
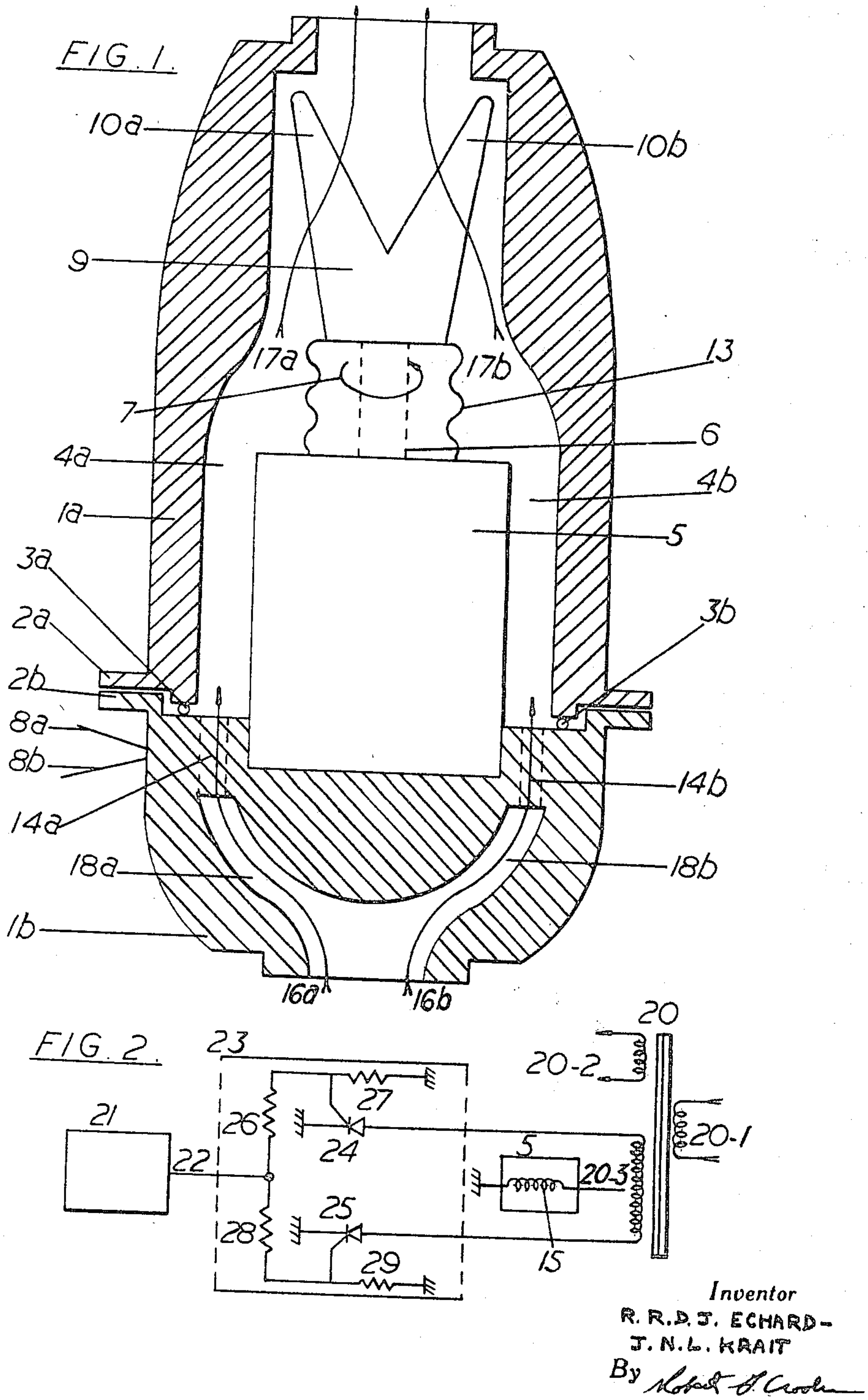

The present invention relates to a pump for circulating liquids. This pump does not require an electric motor, but employs instead a rotary actuator electromagnetically energized by a pulsed current.

Circulating pumps currently used in central-heating installations and, more generally, in other applications suitable for pumps which produce low pressures and low rates of flow, usually comprise centrifugal mechanisms directly coupled to the rotors of low-power induction motors. This arrangement in accordance with the prior art is often characterized by several disadvantages, as follows:

(1) If the stator of the induction motor is insulated from the rotor by a nonmagnetic material which serves the purpose of sealing the motor against leakage of liquid, the air gap in the induction motor becomes substantial, and leads to low motor efficiency.

(2) The rotor of the induction motor is supported by two bearings which must either be liquid-tight or else must be designed for operation in the liquid.

(3) Inasmuch as the components of this type of pump-motor combination are not characterized by symmetry of revolution, accuracy in the machining of these components becomes critical.

(4) As the speed of the induction motor is contsant for each given load, no means for adjusting the flow of the pump is generally available.

(5) When switching on the power to the pump, it is necessary to be sure that the direction of rotation of the induction motor is such as to produce pumping of the liquid in the desired direction.

In view of these disadvantages which are inherent in pumps of the prior art, it is an object of the present invention to provide a circulating pump which avoids these disadvantages.

It is another object of this invention to provide a circulating pump which is easy to manufacture and which has a rate of flow that can be conveniently adjusted.

Briefly, these and other objects of our invention have been fulfilled by providing a circulating pump in which the motive power is converted from electrical to mechanical form by an electromagnetically operated rotary solenoid or actuator, such as are well known to those skilled in the art and are disclosed, for example, in U.S. Patent No. 2,496,880. The rotary solenoid is placed inside a pump housing of cylindical cross section, and its winding is energized by a pulsed current or a train of pulses. These pulses cause the rotary core or armature of the solenoid to rotate periodically through an angle which is a portion of a circle. At the end of each such rotation through an angle which is a portion of a circle, a spring or other resilient means returns the rotary core to its initial position at the termination of the energizing pulse. A thin, flat extended elastic member oriented in a plane parallel to the desired direction of motion of the liquid is fixed to the rotary core in such a way that the axis of the rotary core falls in the plane of the elastic member. The elastic member is formed with a V-shaped cut so that a pair of flaps are defined, each of which can deflect in the pumped fluid when the core of the electromagnet undergoes rotation. Such deflection of the flaps of the elastic member stores potential energy in the member, which is then converted to kinetic energy of the pumped fluid when the flaps reassume their initial undeflected positions. Thus, the flaps displace the pumped fluid in the desired direction when the core of the electromagnet is rotated and again when the core re-assumes its initial position.

In the pump according to the invention, the stationary portion of the rotary solenoid is insulated from the pumped liquid by means of the liquid-tight container of the solenoid. Similarly, the rotary armature is protected from the liquid by means of an elastic bellows which encircles the armature. Thus, no bearings are required, the number of components in the pump is low, the pump is characterized by cylindrical symmetry, and the circulation direction of the pumped liquid is fixed by the construction of the pump. Still further, the flow of liquid through the pump can be adjusted very easily by controlling the frequency of the current pulses supplied thereto.

The present invention will now be described in more detail with reference to the accompanying drawings, in which:

FIGURE 1 is a longitudinal section of the pump taken in a plane which passes through the axis of symmetry of the pump; and FIGURE 2 is a schematic diagram of the electrical control circuit for the electromagnet of the pump.

Turning now to FIGURE 1 of the drawings, we observe that the pump housing comprises two parts 1*a* and 1*b*, respectively coupled to each other by means of circular flanges 2*a* and 2*b*. The coupling between the two parts of the housing can be rendered fluid-tight by means of a toroidal gasket 3*a*–3*b*. The pump housing defines a cavity 4*a*–4*b* in which is accommodated a cylindrical stator portion of a rotary solenoid indicated as electromagnet 5. The solenoid has a rotary armature or core 6. The rotary core moves in the direction of the arrow 7 when the electromagnet is energized by current pulses passing through supply leads 8*a* and 8*b* of the coil. Electromagnet 5 may be fixed by suitable means, such as a thermosetting resin, in a cylindrical cavity in the lower part 1*b* of the pump housing. This arrangement insures the alignment of the longitudinal axis of the electromagnet with the axis of symmetry of the circulating pump. Electric supply leads 8*a* and 8*b* pass through a hole in the pump housing which may be sealed tight either by means of a stuffing box or by the use of a thermosetting resin.

The upper part of the rotary core 6 of the electromagnet bears an extending planar member of elastic material having a V-shaped cut in its median part, thus defining a base 9 and two flaps 10*a* and 10*b* in the planar member. The thickness of the material of the member decreases in the direction from the base 9 to the extremities of the respective flaps 10*a* and 10*b*, so that these flaps are inertially deflected during the stroke of the electromagnet. The deflection of the elastic flaps results in the storage of potential energy in the flaps by virtue of their elasticity. This potential energy is then converted into kinetic energy of the pumped liquid when the flaps of the member re-assume their undeflected condition. The material of the member may be any resilient material such as an elastic plastic or an elastomer having physical and chemical properties which are suitable for use with each particular liquid that is to be pumped.

2

Electromagnet 5 and rotary core 6 are protected from the pumped liquid by a cylindrical bellows 13, which may be made of rubber or other suitable elastic material. The pattern of liquid flow through the pump housing is such that, when the electromagnet is at rest, circulation of the liquid can take place without impediment. For instance, if the pump is installed in a central-heating installation where convection produces some circulation of the heating fluid, such circulation can take place freely through this pump without interference by the pump structure. For this purpose, part 1*b* of the pump housing is provided with a series of holes 14*a*–14*b* near its periphery. Moreover, the annular space 4*a*–4*b* between part 1*a* of the housing and the electromagnet 5 is characterized by an adequate cross section to permit free flow of the pumped liquid. Inlet channels 18*a* and 18*b*, formed in part 1*b* of the pump housing, are also characterized by a cross section which is adequate for the free flow of the pumped liquid.

When electromagnet 5 is energized, the rotary core 6 moves in the direction of the arrow 7 and carries with it the member, whose flaps 10*a* and 10*b* deflect because of the resistance of the liquid in the pump chamber. When the core of the electromagnet reaches the end of its rotary stroke, the flaps stand upright again and propel the liquid forward through the pump chamber by a sort of sculling action. Upon the termination of the energization of the electromagnet, the same type of action takes place in reverse order as the core returns to its initial rest position under the influence of a bias spring or other resilient means. This return stroke of the core again causes a deflection and a recovery of the webs of the membrane, each time producing some propulsion of the liquid through the pump chamber. The construction of the pump is such that this propulsion must take place in the direction of arrows 16*a*, 16*b*, 17*a* and 17*b* as shown in FIGURE 1. The assembly of the pump by means of flanges 2*a* and 2*b*, which may be bolted together, permits rapid disassembly of the pump for any purpose, such as cleaning.

Turning now to FIGURE 2 of the drawings, we find illustrated the electric control circuit which provides the pulses that energize the pump and control its speed of operation. The speed of operation may depend not only upon the repetition rate of pulses but also upon their duration. The electric circuitry illustrated in FIGURE 2 comprises a transformer 20, a multivibrator 21 capable of delivering pulses of variable duty factor at its terminal 22, and a control circuit 23 as indicated generally by the box formed by dashed lines in FIGURE 2. The pulses delivered by multivibrator 21 may, if desired, be rectangular in their configuration.

Transformer 20 includes a winding 20–1 for connection to the supply mains, a winding 20–2 for supplying power to multivibrator 21, and a winding 20–3 for supplying power to a winding 15 of electromagnet 5. If multivibrator 21 requires a supply of direct current, a rectifier may be included in the lines between winding 20–2 and multivibrator 21.

The control circuit 23, as included within the box of dashed lines, comprises a full-wave silicon-controlled-rectifier circuit in which the firing points of the silicon controlled rectifiers are controlled by pulses delivered by multivibrator 21. These pulses are fed from multivibrator 21 to the respective silicon controlled rectifiers 24 and 25 through resistors 26 and 28, which may serve as attenuators. Resistors 27 and 29, connected between the respective gate electrodes of the silicon controlled rectifiers and a point of ground potential, may serve a decoupling function as well as developing voltage for the control of the gate electrodes. Silicon controlled rectifiers 24 and 25 are connected in full-wave fashion to the respective ends of winding 20–3 of transformer 20. The center tap of winding 20–3 supplies pulses of rectified current to winding 15 of electromagnet 5. As has been pointed out, one of the advantages of this pump over the pumps of the prior art resides in the ability to control the rate of liquid displacement through the pump. The rate of liquid displacement may be governed by changing the repetition frequency or the duty factor of the multivibrator output signals. Of course, this repetition frequency and duty factor may be varied by modifying the values of one or more of the coupling resistors in the multivibrator. If it is desired to have the pulse repetition frequency, and hence the rate of liquid flow, depend upon the temperature of a medium, one of the coupling resistors of the multivibrator may be a thermistor which is mounted in the medium whose temperature is to be regulated. Thus, changes in the liquid temperature affect the resistance of the thermistor and change the pulse repetition rate of the multivibrator, thereby controlling the rate of flow of liquid through the pump in a desired manner. This type of closed-loop regulation is particularly adaptable to hydronic heating systems.

While our invention has been described in connection with specific embodiments, it is to be understood that this description is exemplary only, and is not to be considered as a limitation upon the scope of the invention. For instance, although this pump has been described as particularly adapted for use in heating systems, it will be understood that the pump according to the invention may be adapted for many other applications, such as those in the circulation of medical fluids. A pump of this type would be especially suitable for use in the circulation of blood through an artificial heart because this type of pump can be fully sealed, thereby insuring against the contamination of the pumped liquid with lubricant or any other foreign material. In view of the wide applicability of the pump according to this invention, the scope of patent coverage is to be determined only by the appended claims.

What we claim as new and desire to secure by Letters Patent of the United States is:

1. A fluid pump comprising: a housing having a chamber therein; a fluid inlet to said chamber; a fluid outlet from said chamber; a rotary solenoid within said housing, said rotary solenoid having an electromagnet, a rotary core associated with said electromagnet, said rotary core having attached thereto a thin flat elastic member oriented in the general direction from said fluid inlet toward said fluid outlet, said elastic member having an extremity freely disposed near the fluid outlet of said chamber; and means for energizing said rotary solenoid to cause said core and said elastic member to rotate and return through a portion of a circular arc, whereby said freely disposed extremity forces said fluid toward said outlet responsive to the rotation of said elastic member.

2. A fluid pump in accordance with claim 1 in which said elastic member has at its free extremity a V-shaped cut which forms a pair of flaps near said free extremity of said elastic member.

3. A fluid pump in accordance with claim 1 in which the cross section of said elastic membrane decreases in the direction from said rotary core toward said extremity of said elastic member.

4. A fluid pump in accordance with claim 1 in which said rotary core is encircled by a flexible fluid-tight bellows for protecting said core from fluid in said chamber.

5. A fluid pump in accordance with claim 4 in which said electromagnet is furnished with a fluid-tight cover which cooperates with said flexible bellows to seal said electromagnet and said rotary core against fluid in said chamber.

6. A fluid pump in accordance with claim 1 in which a substantially annular space is formed around said electromagnet and said core, within said chamber, for through-passage of fluid.

7. A fluid pump in accordance with claim 1 in which said housing is subdivided into two portions, each of which is fitted with a flange for attaching together said two portions of said housing during operation of said pump.

8. A fluid pump in accordance with claim 1 further including an electric pulse circuit for energizing the winding of said electromagnet.

9. A fluid pump in accordance with claim 8 in which said pulse circuit comprises a full-wave silicon-controlled-rectifier circuit.

10. A fluid pump in accordance with claim 9 in which said full-wave silicon-controlled-rectifier circuit is controlled by a multivibrator.

References Cited

UNITED STATES PATENTS

| | | | |
|---|---|---|---|
| 2,911,918 | 11/1959 | Reed | 103—87 |
| 3,170,097 | 2/1965 | Owens et al. | 310—37 X |

ROBERT M. WALKER, *Primary Examiner.*